United States Patent
Flotats Villagrasa et al.

(10) Patent No.: US 8,179,531 B2
(45) Date of Patent: May 15, 2012

(54) SHUTTERING AND SEALING DEVICE (75) Inventors: Carles Flotats Villagrasa, Barcelona (ES); Jordi Ferran Cases, Cerdanyola del Valles (ES); Oscar Martinez Bailac, Castelldefels (ES); David A. Champion, Lebanon, OR (US); Stephan R. Clark, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 429 days.

(21) Appl. No.: 12/486,747

(22) Filed: Jun. 17, 2009

(65) Prior Publication Data

US 2010/0321687 A1 Dec. 23, 2010

(51) Int. Cl.
*G03B 9/36* (2006.01)
(52) U.S. Cl. ......................... 356/402; 396/483
(58) Field of Classification Search .................. 359/227, 359/507, 513; 396/452, 483; 362/321; 356/402
See application file for complete search history.

(56) References Cited

U.S. PATENT DOCUMENTS

| | | | |
|---|---|---|---|
| 3,659,100 A * | 4/1972 | Anderson et al. | 250/573 |
| 6,373,574 B1 * | 4/2002 | Gu et al. | 356/419 |
| 6,639,669 B2 | 10/2003 | Hubble, III et al. | |
| 6,836,325 B2 * | 12/2004 | Maczura et al. | 356/328 |
| 7,365,843 B2 | 4/2008 | Frick et al. | |
| 2003/0063275 A1 | 4/2003 | Hubble, III et al. | |
| 2007/0070450 A1 | 3/2007 | Tanaka et al. | |
| 2008/0292360 A1 | 11/2008 | Hirai | |
| 2008/0309921 A1 | 12/2008 | Faase et al. | |
| 2009/0040505 A1 * | 2/2009 | Ackerman et al. | 356/36 |

OTHER PUBLICATIONS

Michael Davis, "A home-built astrographic camera", Jun. 2, 2007, www.mdpub.com/scopeworks/astrograph.html, pp. 1-3.*

* cited by examiner

*Primary Examiner* — Kara E Geisel
(74) *Attorney, Agent, or Firm* — Garry A. Perry (57) ABSTRACT

A shuttering and sealing device is disclosed. In one embodiment, the device includes an aperture through which light may pass to an optical sensor, a seal surrounding the aperture, and a shutter movable between an open position in which the shutter does not cover the aperture and a closed position in which the shutter covers the aperture and the seal seals the shutter around the aperture.

16 Claims, 7 Drawing Sheets

SHUTTERING AND SEALING DEVICE

BACKGROUND

Users of printing devices desire color consistency and color accuracy in printed materials despite changes, or equipment changes in the printing environment or equipment (e.g. use of multiple printing devices, changes in media, inks, replacement of printheads). For example, a commercial user sometimes prints company logos and other artwork comprising specific color schemes that consumers associate with that user's products. Such a user often desires the capability to accurately and consistently print specific shade, tint and hues notwithstanding changes in the printing environment and/or utilization of multiple printing devices.

To maintain such color consistency and color accuracy during printing, current printing devices may incorporate a spectrophotometer to provide online color profiling capability. To provide the desired color consistency, the spectrophotometer may utilize color sensing optics and electronics to measure a profiling patch created by the printing device in which the spectrophotometer is housed. To provide the desired color accuracy, the spectrophotometer may utilize color sensing optics and electronics to measure an internal color reference to calibrate the spectrophotometer to a known standard. These online measurements may then be used to make adjustments to the printing device to maintain color consistency and color accuracy in the final product.

The performance of a spectrophotometer degrades as microscopic droplets of ink floating inside the printer (aerosol) stain and create deposits on the surfaces of the color-sensing optics and/or the color calibration tile. Other debris, such as bits of torn media, may also interfere with the function of an online spectrophotometer. Failure to protect the spectrophotometer from such contamination may result in inaccurate or inconsistent colors, decreased customer satisfaction and increased cost of ownership.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

DETAILED DESCRIPTION OF EMBODIMENTS

Embodiments of the new shuttering and sealing device were developed in an effort to protect an optical sensor from aerosol, debris and other contamination, and to thereby improve performance. Embodiments are described with reference to a spectrophotometer and a printing device. The embodiments shown in the accompanying drawings and described below, however, are non-limiting examples. Other embodiments are possible and nothing in the accompanying drawings or in this Detailed Description of Embodiments should be construed to limit the scope of the disclosure, which is defined in the Claims.

Figure 1:
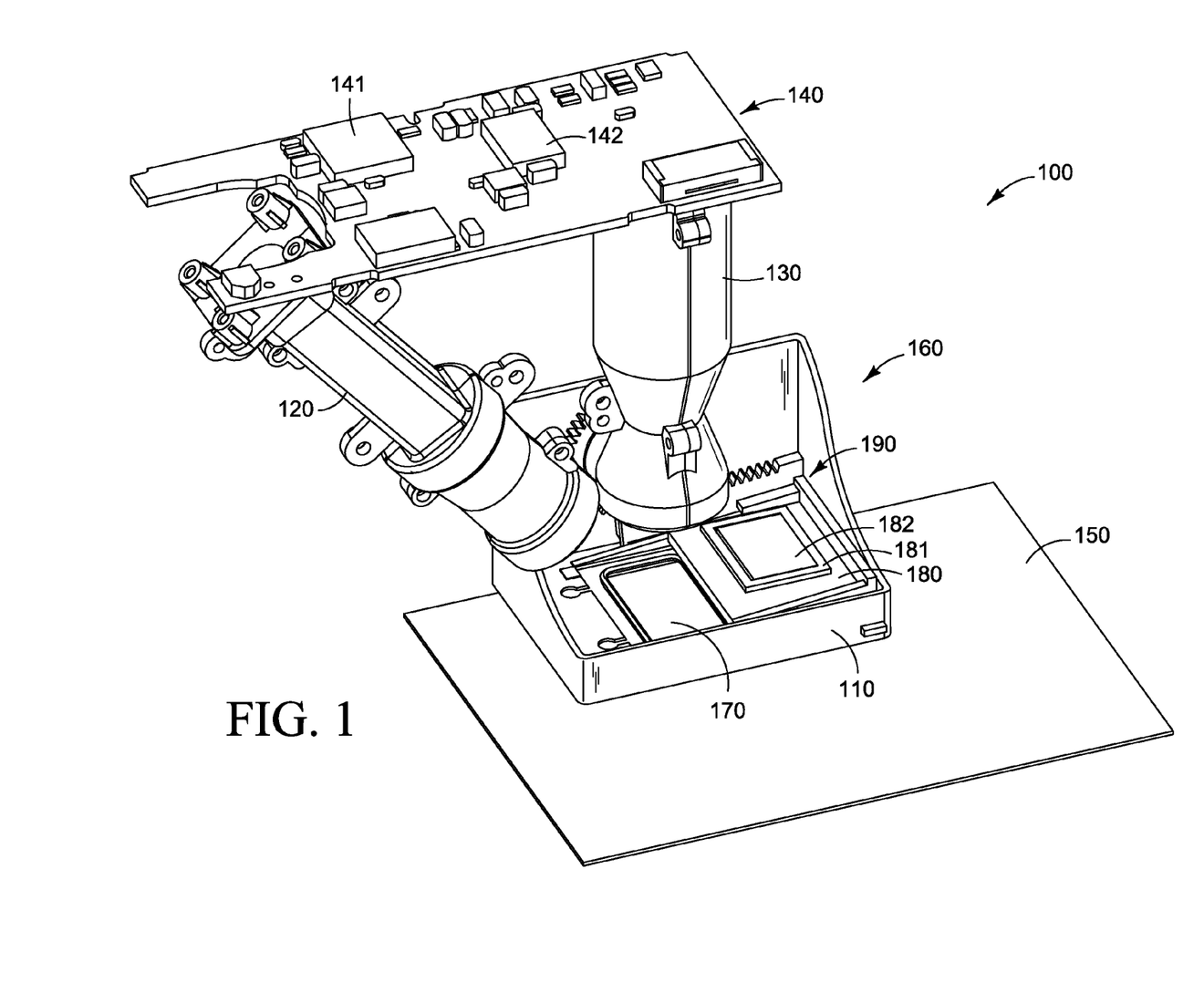
FIG. 1 is a diagram of an embodiment of a spectrophotometer with a shuttering and sealing device, illustrating the shutter in an open position.
Figure 2:
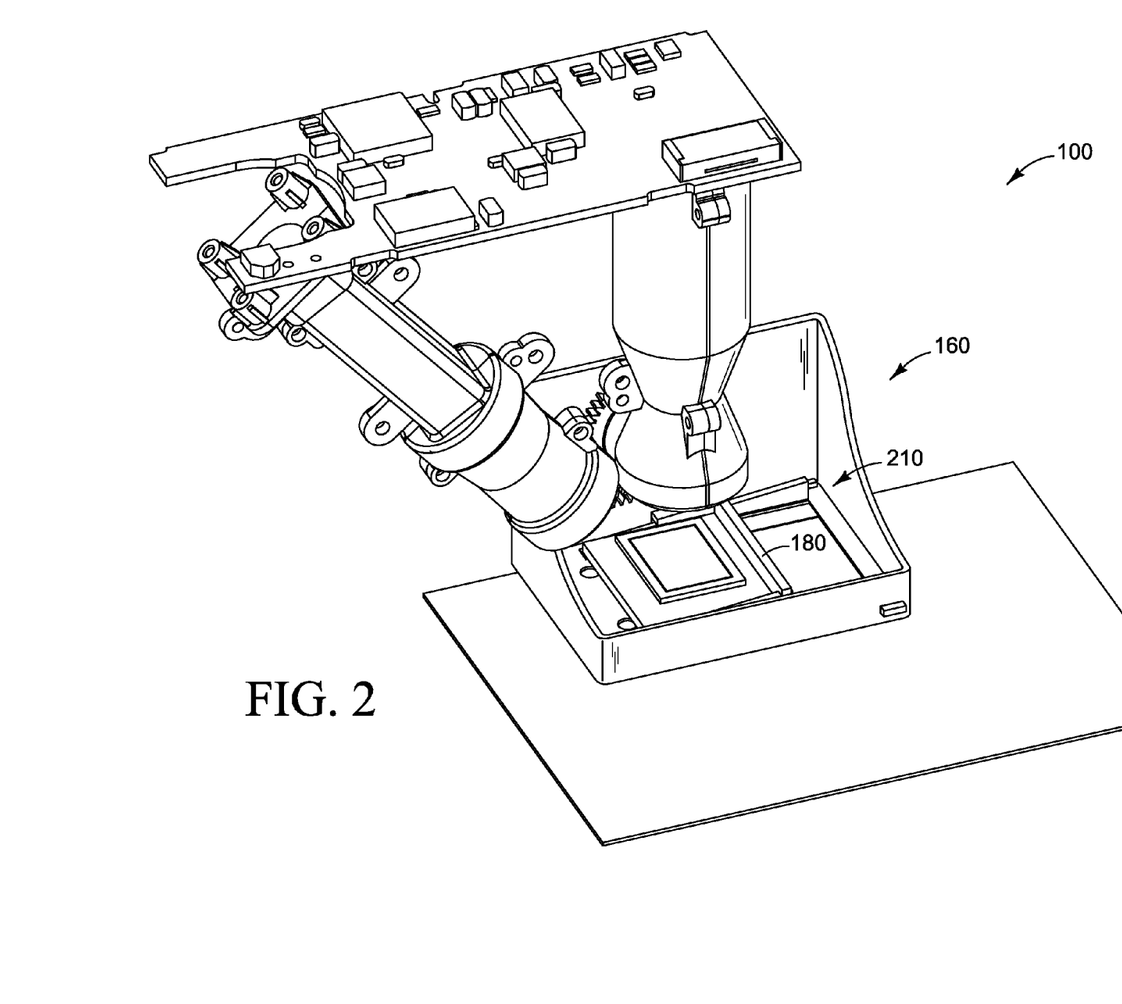
FIG. 2 is a diagram of the spectrophotometer of FIG. 1 illustrating the shutter in a closed position.

FIG. 1 is a diagram of an embodiment of a spectrophotometer with a shuttering and sealing device, illustrating the shutter in an open position. FIG. 2 is a diagram of the spectrophotometer of FIG. 1 illustrating the shutter in a closed position. FIG. 1 and FIG. 2 are cutaway views of the spectrophotometer 100, and illustrate the external structure 110 in part.

As shown in FIG. 1 and FIG. 2, an exemplary spectrophotometer 100 includes an illumination element 120, an optical sensor 130, a controller 140, and a shuttering and sealing device 160.

In an embodiment the spectrophotometer may be incorporated in a printing device. In an embodiment the spectrophotometer 100 is configured to operate in at least three modes—a profiling mode, a calibration mode, and a standby mode. In the profiling mode, the spectrophotometer 100 measures the amount of light reflected from an external target 150, and produces color spectral data for such external target 150. In an embodiment where the spectrophotometer 100 is incorporated into a printing device, it will be desirable to create a profile for a plurality of printed colors across the spectrum by measuring a plurality of color profiling patches. In order to save time and printing space, the plurality of color profiling patches may be printed on a single media. In the calibration mode, the spectrophotometer 100 measures the amount of light reflected from a color calibration tile 182, and produces color spectral data for this reference. The spectrophotometer 100 will then compare the spectral data readings for the color calibration tile 182 with known attributes for the color calibration tile 182, and make adjusting corrections so that the spectrophotometer 100 measures accurately as compared to a known standard. In standby mode, the spectrophotometer 100's light measuring elements are not utilized for measuring. In an embodiment, a spectrophotometer 100 that is embedded in a printing device is in standby mode while the printing device is in a printing mode.

Illumination element 120 connects to a controller 140, and projects light upon the target to be measured. When the spectrophotometer 100 is in profiling mode, the illumination element 120 projects light upon an external target 150. When the spectrophotometer 100 is in calibration mode, the illumination element 120 projects light upon a color calibration tile 182. When the spectrophotometer 100 is in standby mode, the illumination element 120 need not project light as the spectrophotometer's 100 measuring function is suspended.

Optical sensor 130 connects to controller 140, and is configured to detect the light reflected to the optical sensor 130 from a target. When the optical sensor 130 detects the light, the optical sensor 130 produces a corresponding electronic signal that may be routed to the controller 140 or to another device that is monitoring the output of the spectrophotometer 100. When the spectrophotometer 100 is in profiling mode the target is an external target 150 located outside the spectrophotometer 100. In an embodiment the spectrophotometer 100 is incorporated in a printing device, and the external target 150 is a color profiling patch that was produced by the printing device. When spectrophotometer 100 is in calibration mode, the target is a color calibration tile 182.

Controller 140 connects to, and directs the operation of, illumination element 120 and optical sensor 130. A controller 140, for example, may include a processor 141 and a memory 142. Processor 141 may represent multiple processors, and memory 142 may represent multiple memories. The controller 140 monitors and interprets the electronic signals sent by the optical sensor 130 so as to assign spectral data attributes to the target. When the spectrophotometer 100 is in profiling mode the target is an external target 150 located outside the spectrophotometer 100. In an embodiment the spectrophotometer 100 is incorporated in a printing device, and the external target is a color profiling patch that was produced by the printing device. When spectrophotometer 100 is in calibration mode, the target is a color calibration tile 182.

A shuttering and sealing device 160 comprises an aperture 170 and shutter 180, and is depicted with a shutter in an open position 190 in FIG. 1 and in a closed position 210 in FIG. 2. Additional detail regarding the shuttering and sealing device 160 is presented in the discussion of FIG. 3 and FIG. 4 below.

As used in this specification and the appended claims, "aperture" means an opening in a structure. Aperture 170 is located within the external structure 110 of spectrophotometer 100, situated such that there is an optical line of sight, through the aperture, between the illumination element 120 situated inside the spectrophotometer 100 and the external target 150, and between the optical sensor 130 situated inside the spectrophotometer 100 and the external target 150.

As used in this specification and the appended claims, "shutter" means a movable panel that may move back and forth between an open position and a closed position. As used in this specification and the appended claims, "open position" means a position in which the shutter 180 has been moved away from the aperture 170 so as to allow light to pass from the illumination element 120, through the aperture 170, and to an external target 150, and also so as to allow light to reflect back from the external target 150 through the aperture 170 and to an optical sensor 130. The shutter 180 is in the open position 190 (FIG. 3) while the spectrophotometer 100 is in the profiling mode. As used in this specification and the appended claims, "closed position" means a position in which the shutter 180 has been moved to so as to cover and seal the aperture 170, and to position a color calibration tile 182 situated on the optical-sensor facing side of the shutter 180 such that there is an optical line of sight between the illumination element 120 and the color calibration tile 182, and between the optical sensor 130 and the color calibration tile 182. This closed position 210 (FIG. 4) prevents contaminants from passing through the aperture 170 and entering the spectrophotometer 100 when the spectrophotometer 100 is in calibration mode or standby mode. Second, the closed position 210 (FIG. 4) situates the color calibration tile 182 in a precise position such that the illumination element 120 will illuminate the color calibration tile 182, and such that light reflected from the illuminated color calibration tile 182 can be detected by the optical sensor 130 when the spectrophotometer 100 is in calibration mode.

In an embodiment the optical sensor-facing side of the shutter 180 includes a frame 181 for holding a color calibration tile 182. In an embodiment the color calibration tile 182 attaches to the shutter 180 without a frame. The frame 181 and the color calibration tile 182 are configured such that the illumination element 120 and the optical sensor 130 are pointing to the color calibration tile 182, and the color calibration tile 182 is exposed to the optical sensor 130 when the shutter 180 is in the closed position 210.

Figure 3:
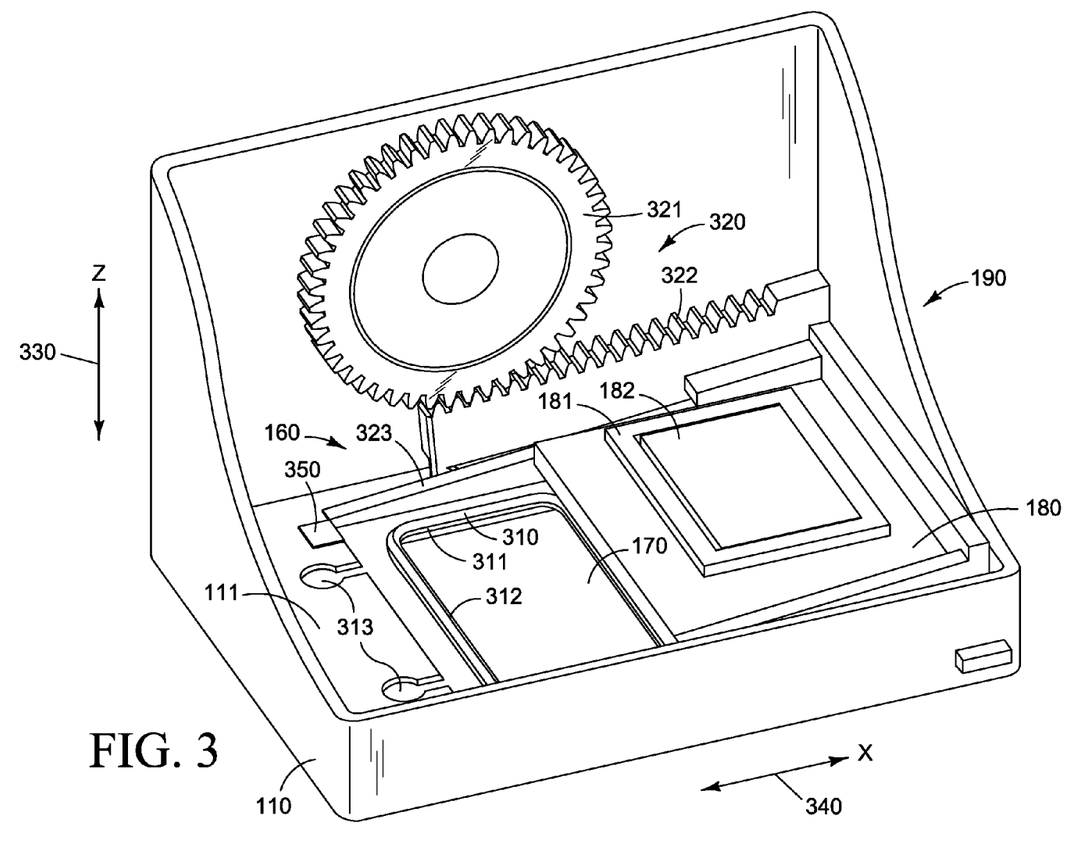
FIG. 3 is a diagram of an embodiment of a shuttering and sealing device, illustrating the shutter in an open position.
Figure 4:
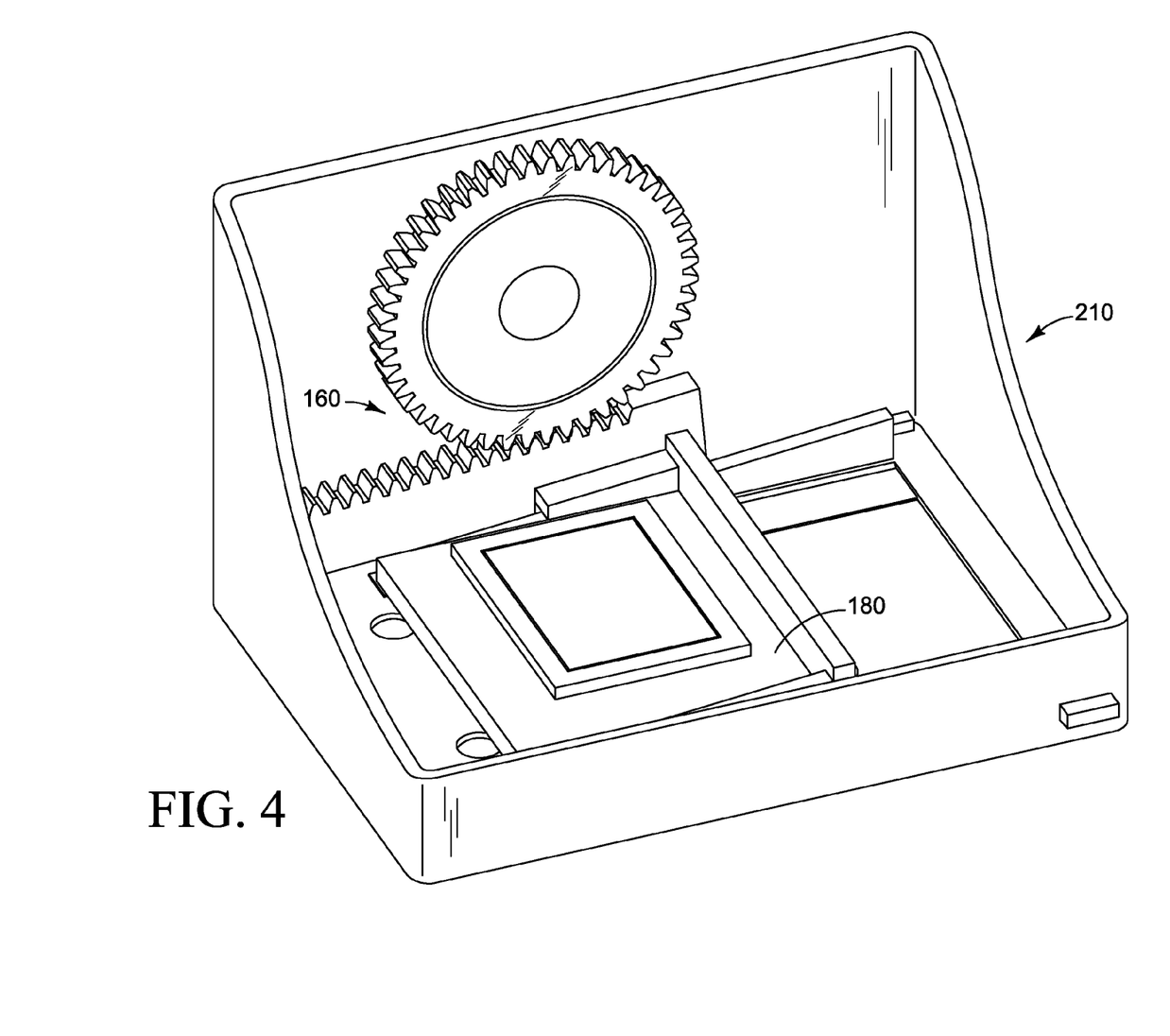
FIG. 4 is a diagram of the shuttering and sealing device of FIG. 3 illustrating the shutter in a closed position.

FIG. 3 is a diagram of an embodiment of a shuttering and sealing device, illustrating the shutter in an open position. FIG. 4 is a diagram of the shuttering and sealing device of FIG. 3 illustrating the shutter in a closed position. FIG. 3 and FIG. 4 are cutaway views of the spectrophotometer 100, and illustrate the external structure 110 in part.

A seal 310 surrounds the aperture 170. In an embodiment the seal attaches to the external structure 110. The seal 310 is made out of a flexible and compressible material, such that the shutter 180 compresses the seal 310 when the shutter is in the closed position 210. The shutter 180 closing against a flexible, compressible seal 310 results in the aperture 170 being completely covered in an air-tight manner. In an embodiment, the seal 310 constitutes a rubber rim situated around the aperture 170. The seal 310 may be an independent part attached to the external structure 110. In an embodiment the seal 310 is attached to the external structure using injection overmolding. As used in this specification and the appended claims, "injection overmolding" of an article means a molding operation involving a plurality of injection operations and the applying a plurality of layers over the first layer to form the article. In an embodiment, the seal 310 includes four seating portions 313 that are recessed in relation to the inside surface 111 of the external structure 110. The seating portions position the seal 310, and may assist in holding the seal 310 in place.

An actuator 320 attaches to the external structure 110 and moves the shutter 180 back and forth between an open position 190 and the closed position 210. As used in this specification and the appended claims, "actuator" means a device for moving or controlling a mechanism or system by transferring motion from one object to another. In an embodiment, the actuator 320 utilizes a motor-pinion-gear-rack system and comprises a motor that engages with a gear 321, which gear 321 engages with a rack 322, which rack 322 connects to the shutter 180. The actuator 320 may include one or more guides 323 for guiding the shutter 180, which guide 323 engages with the shutter 180. In an embodiment, the guide 323 is situated at a slope, such that the shutter 180 is brought closer to the aperture 170 in a Z direction 330 as the shutter 180 moves in an X direction 340 to the closed position 210. By moving the shutter 180 away from the closed position 210 towards the open position 190 in a slight angle, the shuttering and sealing device 160 avoids friction between the seal 310 and the shutter 180. Such friction would increase the power from the motor needed to move the shutter 180 and could cause the shutter 180 to move in an uneven, jerky manner. In an embodiment the guide 323 is situated at a slope greater than zero and less than twenty degrees in relation to the long axis of the shutter 180 in the closed position 210.

As the positioning of the color calibration tile 182 needs to be precise, the shuttering and sealing device 160 may include one or more contact references 350 for positioning the shutter 180 and the color calibration tile 182 in relationship to the optical sensor 130 when the shutter 180 is in the closed position 210. In an embodiment, three contact references 350 are utilized to position the shutter 180 in a plane parallel with the external structure 110 immediately surrounding the aperture 170, and at a height such that the shutter 180 touches and effectively compresses the seal 310. The contact reference 350 may include a dimensionally controlled surface in the plastic part and serve to provide a positioning reference for the shutter 180 in the Z direction 330.

Figure 5:
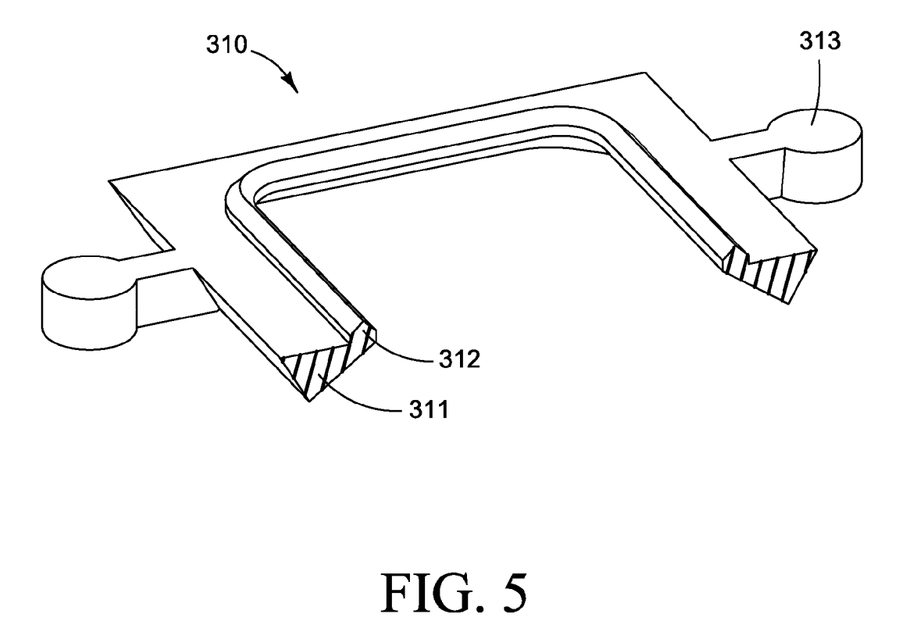
FIG. 5 is a diagram illustrating a cross-section view of one embodiment of a seal in the shuttering and sealing device of FIG. 3.

FIG. 5 is a diagram illustrating a cross-section view of one embodiment of a seal in the shuttering and sealing device of FIG. 3. In an embodiment, seal 310 is composed of a flexible and compressible material, such that the shutter 180 (FIG. 4) compresses the seal 310 when the shutter is in the closed position 210 (FIG. 4). In an embodiment, the seal 310 constitutes a rubber rim situated around the aperture 170 (FIG. 3). In an embodiment, the seal 310 is molded in a manner whereby the seal 310 comprises a lower base portion 311 and an upper protruding lip portion 312 of lesser width than the lower base portion 311. This seal configuration allows for easy compression of the seal 310 by a shutter 180 (FIG. 4) in the closed position 210 (FIG. 4).

When the shuttering and sealing device is to be incorporated in a printing device, the chemical composition of the seal 310 may be determined by choosing a composition that is durable and resistant to aging when used in the heat ranges and with the inks to be utilized in the printing device. In the case of an inkjet printing device, it may be advantageous to construct the seal 310 out of the same chemical compounds that is used to construct a printhead capping device in the printing device's service station.

Figure 6:
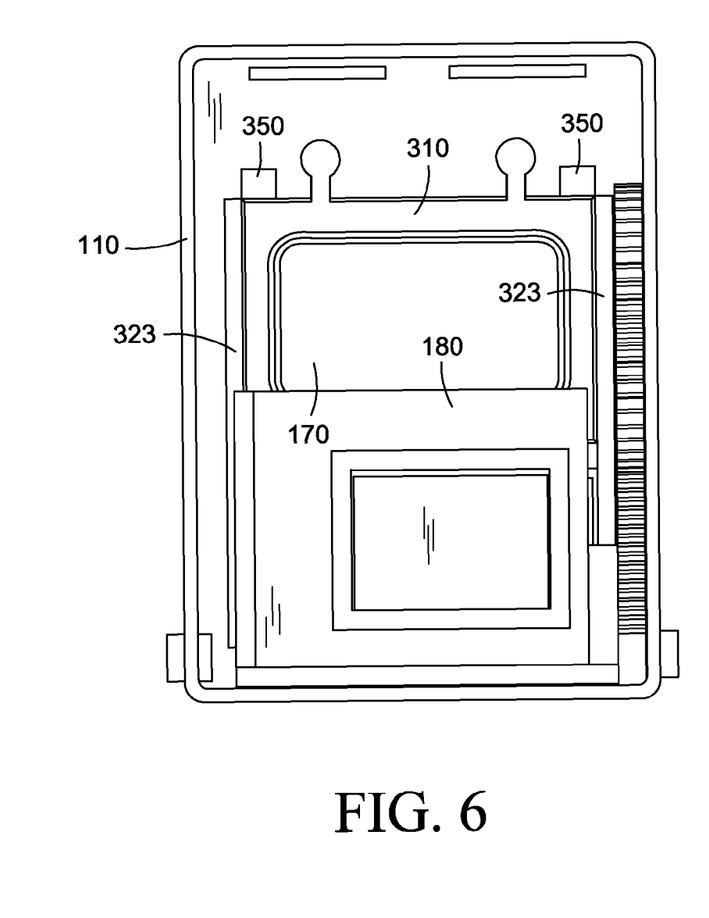
FIG. 6 is a diagram illustrating a top-down view of one embodiment of contact references in the shuttering and sealing device of FIG. 3 with the shutter in place.
Figure 7:
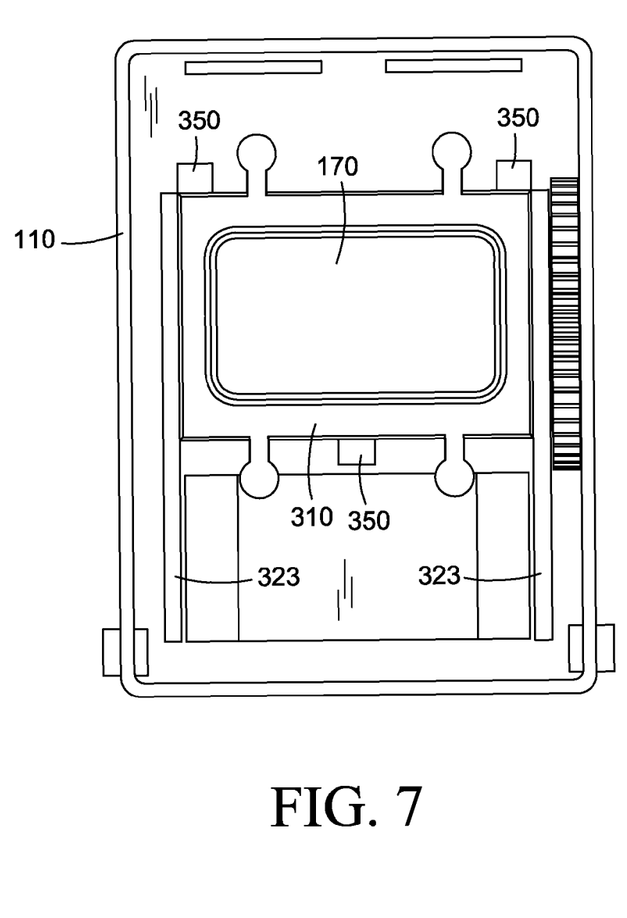
FIG. 7 is a diagram illustrating a top-down view of one embodiment of contact references in the shuttering and sealing device of FIG. 3 with the shutter removed.

FIG. 6 and FIG. 7 are diagrams illustrating at top-down view of one embodiment of contact references in the shuttering and sealing device of FIG. 3. FIG. 7 illustrates an embodiment with the shutter 180 in place. FIG. 7 illustrates that embodiment with the shutter 180 removed to provide a view of contact references 350 that are located beneath the shutter 180 and are therefore not visible in FIG. 6. In an embodiment, the contact references 350 constitute three shutter-facing flat surfaces that are coupled to, and protrude slightly above, the shutter-facing side of the external structure 110, and three aperture-facing contact references 350 coupled to the aperture-facing side of the shutter 180. In this embodiment the three shutter-facing contact references 350 and the three aperture-facing contact references 350 touch when the shutter 180 is in the closed position 210 (FIG. 4). The heights of the contact references 350 are such that the shutter 180 touches the contact references 350 midway in the process of compressing the protruding lip portion 312 (FIG. 5) of the seal 310. If the contact reference 350 surfaces are too high, the shutter 180 will touch the contact references 350 before compressing the protruding lip portion 312 (FIG. 5) of the seal 310 and the shutter 180 will not seal against the external structure 110. If the contact reference 350 surfaces are too low, the protruding lip portion 312 (FIG. 5) of the seal 310 will be compressed to the maximum before the shutter 180 contacts the contact references 350 on the floor of the external structure 110, and the position of the shutter 180 and a color calibration tile 182 will not be determined. When the contact 350 references are situated at the appropriate height, a shutter 180 moving to the closed position 210 (FIG. 4) compresses the protruding lip portion 312 (FIG. 5) of the seal 310 (thereby sealing) as the shutter 180 reaches the contact reference 350.

In an embodiment, there are three or more contact references 350 coupled to the shutter-facing side of the external structure 110, and an equal number of contact references 350 coupled to the aperture-facing side of the shutter 180. The contact references 350 are situated such that the contact references 350 affixed to the shutter-facing side of the external structure 110 will touch the contact references 350 affixed to the aperture-facing side of the shutter 180 when the shutter 180 is in the closed position 210 (FIG. 4).

Figure 8:
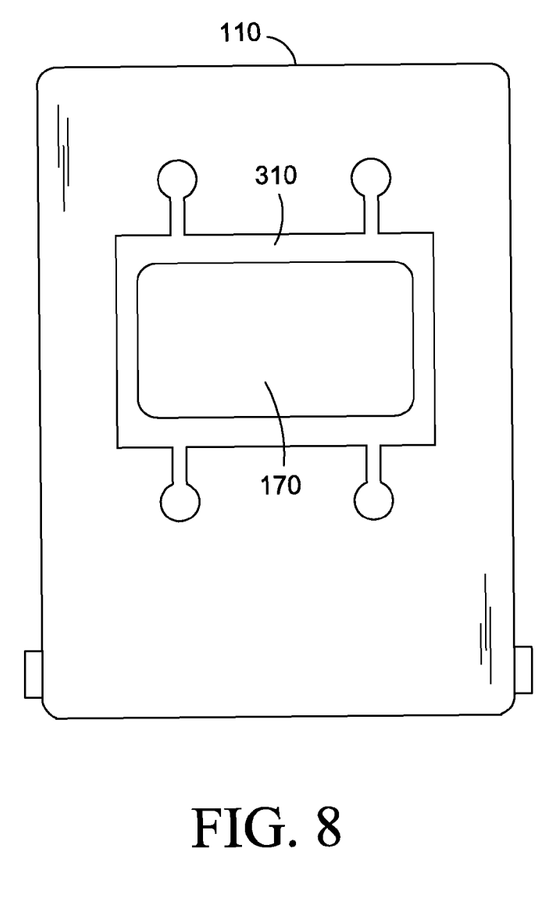
FIG. 8 is a diagram illustrating a bottom-up view of the shuttering and sealing device of FIG. 3, with the shutter in an open position.

FIG. 8 is a diagram illustrating a bottom-up view of the shuttering and sealing device of FIG. 3, with the shutter in an open position. Seal 310 connects to the spectrophotometer's 100 external structure 110. Aperture 170 is visible from this view as the shutter is retracted and does not cover the aperture 170.

Figure 9:
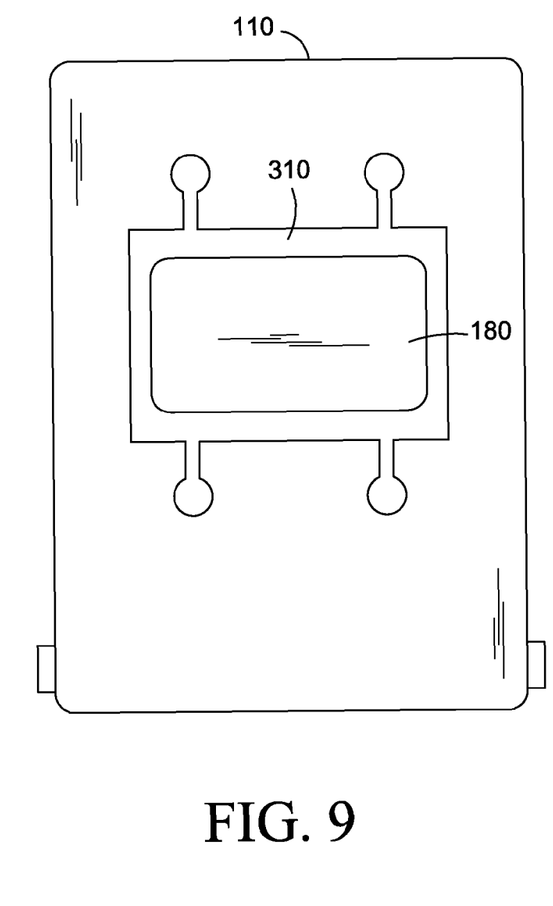
FIG. 9 is a diagram illustrating a bottom-up view of the shuttering and sealing device of FIG. 3, with the shutter in a closed position.

FIG. 9 is a diagram illustrating a bottom-up view of the shuttering and sealing device of FIG. 3, with the shutter in a closed position. A flexible, compressible seal 310 connects to a spectrophotometer's 100 external structure 110. The shutter 180 is in a closed position resting against the seal 310. This configuration results in the aperture 170 being completely covered in an air-tight manner. The seal 310 may be an independent part attached to the external structure 110. In an embodiment the seal 310 is attached to the external structure using injection overmolding.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A shuttering and sealing device, comprising:
   an aperture through which light may pass to an optical sensor;
   a seal surrounding the aperture;
   a shutter movable between an open position in which the shutter does not cover the aperture and a closed position in which the shutter covers the aperture and the seal seals the shutter around the aperture; and
   an actuator for moving the shutter between the open and closed positions, wherein the actuator comprises a guide for guiding the shutter, the guide situated at a slope such that the shutter is brought closer to the aperture in a Z direction as the shutter moves in an X direction to the closed position.

2. The device of claim 1, further comprising an optical sensor.

3. The device of claim 1, wherein the seal comprises compressible material and the shutter compresses the seal when the shutter is in the closed position.

4. The device of claim 3, wherein the seal comprises a protruding lip.

5. The device of claim 1, wherein the slope is greater than zero and less than twenty degrees in relation to the long axis of the shutter in the closed position.

6. The device of claim 1, further comprising a frame for holding a color calibration tile, the frame coupled to the shutter, such that the color calibration tile is exposed to the optical sensor when the shutter is in the closed position.

7. The device of claim 1, further comprising a color calibration tile coupled to the shutter such that the color calibration tile is exposed to the optical sensor when the shutter is in the closed position.

8. The device of claim 7, further comprising a contact reference for positioning the shutter and the color calibration tile accurately in relationship to the optical sensor when the shutter is in the closed position.

9. A shuttering and sealing device, comprising:
   an aperture through which light may pass to an optical sensor;
   a seal surrounding the aperture, wherein the seal comprises compressible material and the shutter compresses the seal when the shutter is in the closed position;
   a shutter movable between an open position in which the shutter does not cover the aperture and a closed position in which the shutter covers the aperture and the seal seals the shutter around the aperture; and an actuator for moving the shutter between the open and closed positions, wherein the actuator comprises a contact reference for positioning the shutter and a color calibration tile to be acted upon accurately in relationship to the optical sensor when the shutter is in the closed position; and a guide situated at a slope, such that the shutter is brought closer to the aperture in a Z direction as the shutter moves in an X direction to the closed position.

10. The device of claim 9, further comprising a frame for holding a color calibration tile, coupled to the shutter, such that the color calibration tile is exposed to the optical sensor when the shutter is in the closed position.

11. The device of claim 9, further comprising a color calibration tile coupled to the shutter, such that the color calibration tile is exposed to the optical sensor when the shutter is in the closed position.

12. A spectrophotometer, comprising:
an illumination element;
an optical sensor;
an aperture through which light may pass to the optical sensor;
a seal surrounding the aperture;
a shutter movable between an open position in which the shutter does not cover the aperture and a closed position in which the shutter covers the aperture and the seal seals the shutter around the aperture; and an actuator for moving the shutter between the open and closed positions, wherein the actuator comprises a guide for guiding the shutter situated at a slope, such that the shutter is brought closer to the aperture in a Z direction as the shutter moves in an X direction to the closed position.

13. The device of claim 12, wherein the seal comprises compressible material and the shutter compresses the seal when the shutter is in the closed position.

14. The device of claim 13, wherein the seal comprises a protruding lip.

15. The device of claim 12, wherein the shutter comprises a color calibration tile coupled to the shutter, such that the color calibration tile is exposed to the optical sensor when the shutter is in the closed position.

16. The device of claim 12, further comprising a contact reference for positioning the shutter and the color calibration tile accurately in relationship to the optical sensor when the shutter is in the closed position.

* * * * *